Sept. 20, 1971  G. DOBRITZ  3,605,785
APPARATUS FOR MIXING GASES IN A PREDETERMINED RATIO
PARTICULARLY FOR RESPIRATORY AND MEDICAL PURPOSES
Filed June 6, 1969  2 Sheets-Sheet 1

INVENTOR.
Günter Dobritz by McGlew & Toren
ATTORNEYS.

United States Patent Office 3,605,785
Patented Sept. 20, 1971

3,605,785
**APPARATUS FOR MIXING GASES IN A PRE-
DETERMINED RATIO PARTICULARLY FOR
RESPIRATORY AND MEDICAL PURPOSES**
Gunter Dobritz, Lubeck, Germany, assignor to Drager-
werk Aktiengesellschaft, Lubeck, Germany
Filed June 6, 1969, Ser. No. 831,095
Claims priority, application Germany, June 15, 1968,
P 17 57 801.7
Int. Cl. G05d 11/02
U.S. Cl. 137—101
22 Claims

ABSTRACT OF THE DISCLOSURE

Two gases to be mixed are introduced, at equal pressures, into respective chambers whose volumes have the desired mixture ratio. The gases continue to be introduced into the respective chambers until the pressure in the chambers attains a desired value, after which flow of gases into the chambers is interrupted and flow of gases from the chambers is initiated. As the gases flow from the chambers, they are mixed to form the gas mixture. A pressure reducer is connected to the two gas inflow lines to equalize the two gas pressures. A shut-off valve is operatively associated with each inflow line, between the pressure reducer and a respective chamber. A shut-off valve also controls the outflow of gas to a further pressure equalizing pressure reducer valve whose output is connected to a gas mixing tank or the like. In a modification, the pressure reducing inflow valve and the shut-off valves are combined into a single unit. Preferably, means are provided to assure maintenance of equal pressure in the two chambers.

BACKGROUND OF THE INVENTION

There are known methods and devices for mixing gas currents. In one method, two gases under pressure are expanded through respective throttle valves and flowmeters into a common discharge pipe, with the mixing ratio of the gases being established in the flowmeters. This method has the disadvantage that the flowmeters and the throttle valves must be constantly monitored. Additionally, it is necessary to ascertain that an exactly defined pressure is always maintained in the flowmeters, as otherwise the readings of the flowmeters will not be correct.

An additional disadvantage of this method is that maintenance of a certain discharge pressure must also be assured. In practice, this method can work properly only above a certain velocity of flow, namely in the so-called super-critical range. This is a disadvantage because this range cannot be maintained with certainty and with simple means.

In another method, two pressure gases are expanded to atmospheric pressure and drawn into piston pumps having variable stroke volumes. The piston pumps force the gases into the discharge pipe. This method has the disadvantage that it requires a great number of devices, such as the piston pumps, drives for the piston pumps and control devices.

SUMMARY OF THE INVENTION

This invention relates to the mixing of gases in a predetermined ratio to form a gas mixture and, more particularly, to a novel and improved method and apparatus for mixing gases in a predetermined ratio and which are free of disadvantages of prior art methods and apparatuses for this purpose, as well as being operable with simple means.

In accordance with the invention, the gases to be mixed are introduced, at the same pressure and through respective shut-off valves, into two chambers of adjustable volume, the ratio of the two volumes corresponding to the desired ratio of the gases in the gas mixture. The pressure in the chambers are built up until a predetermined pressure is attained, after which the shut-off valve or valves are closed and the gases flow from the chambers, after opening additional shut-off valves, into the discharge pipes and thence into a gas mixing chamber. The invention method provides for the production with simple means, of a gas mixture having the desired concentration ratio of the two gases, since the gases to be introduced, at equal initial pressures, into the chambers can be exactly adjusted in their volume, after which the gases flow off from the chambers and mix exactly according to the desired ratio.

The invention furthermore is directed to a gas mixer for pressure gases in which a pressure reducer is connected to the feed pipes or conduits for the gases to be mixed. This pressure reducer expands the gases to exactly the same pressure. Two chambers, of predetermined volumes, are connected to the pressure reducers through shut-off valves, and the volumetric ratios of the chambers are adjusted exactly in accordance with the desired mixture ratio of the gases. The chambers are connected with gas discharge pipes leading to a gas mixing tank through other shut-off valves. In using the apparatus of the invention, each chamber is filled, during each filling operation, with one of the gases to be mixed to any desired but constant pressure. The gases in the two chambers then expand to the pressure in the common discharge or mixing chamber, and the gases mix in correspondence with the volumetric ratio of the chambers. The mixing ratio in the gas discharge tank thus is determined by the ratio of the volumes of the individual chambers, and thus can be adjusted exactly.

An object of the invention is to provide an improved and simplified method for mixing gases in a predetermined ratio to form a gas mixture.

Another object of the invention is to provide an improved and simplified apparatus for mixing gases in a predetermined ratio to form a gas mixture.

A further object of the invention is to provide such a method and apparatus in which two gases to be mixed are introduced, at equal pressures, into respective chambers whose volumes have the desired mixture ratio.

Another object of the invention is to provide such a method and apparatus in which the supply of gases to the two chambers is maintained, through a shut-off valve, until the pressure in the chambers attains the desired value.

A further object of the invention is to provide such a method and apparatus in which, after the pressure in the chambers attains a desired value, the flow of gases into the chambers is interrupted and flow of gases from the chamber is initiated, with mixing of the gases flowing from the chamber in a gas mixture tank having a common discharge pipe for the two mixed gases.

For an understanding of the principles of the invention, reference is made to the following description of typical embodiments thereof as illustrated in the accompanying drawings.

DESCRIPTION OF THE PREFERRED EMBODIMENTS

Figure 1:
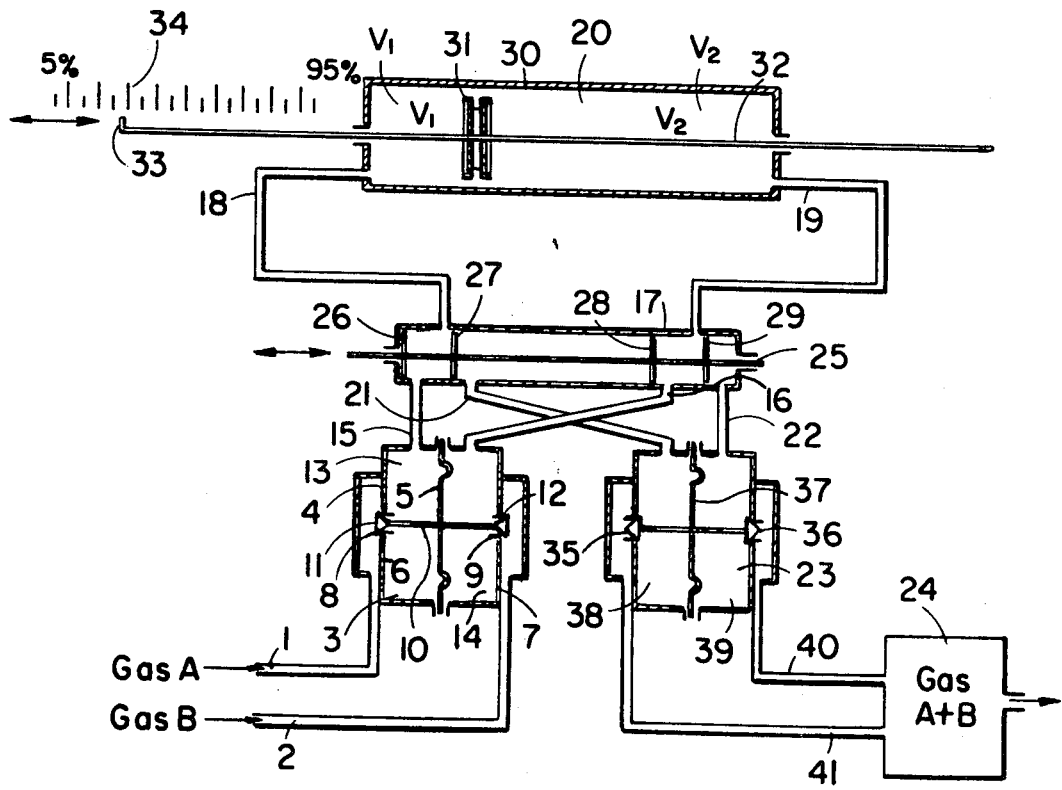
FIGS. 1 and 2 are somewhat diagrammatic representations of two different embodiments of a gas mixer in accordance with the invention.

Referring first to FIG. 1, in this embodiment of the invention, pressure gas lines 1 and 2, through which respective gases A and B are supplied, are connected to opposite sides of a reducing relay or reducing valve 3. Reducing relay or valve 3 comprises a housing 4 subdivided by a centrally arranged control diaphragm 5, the housing having covers 6 and 7 in which are arranged valve seats 8 and 9. Through the medium of connecting rods 10, diaphragm 5 carries, at its opposite surfaces, moving valve parts 11 and 12 so that shut-off valves 8–11 and 9–12 are formed. These shut-off valves control flow of gas from the feed pipes 1 and 2 terminating on the exterior of housing covers 6 and 7.

The respective chambers 13 and 14, at opposite sides of diaphragm 5, are connected through lines 15 and 16 with a gas distributor 17 designed, in the illustrated embodiment, as a switching or change-over valve.

The switching valve 17 can be designed in various ways, and it has the function of connecting lines 15 and 16 either simultaneously with respective lines 18 and 19 leading to the gas ratio adjuster 20, or to interrupt this connection and to connect the lines 18 and 19 with the lines 21 and 22 leading through an additional pressure reducing relay or pressure valve 23 to a gas mixing tank 24.

In the embodiment of FIG. 1, gas distributor 17 is deisgned as a slide valve wherein the inlet ports of the lines 18 and 19 are arranged between the outlet ports of lines 15 and 21 and the outlet ports of lines 16 and 22, respectively. The slide valve is controlled by a reciprocating control rod 25 on which are secured valve discs 26–29. In the position shown in FIG. 1, lines 15 and 16 are connected with lines 18 and 19, respectively. When control rod 25 moves into the other extreme position, lines 18 and 19 are connected with lines 21 and 22 respectively.

Ratio adjuster 20 comprises a cylinder 30 having a piston 31 movable therein and connected to a piston rod 32 extending from ratio adjuster 20 for adjustment and indication. The piston rod can be packed, for example, with stuffing boxes. At one end 33, piston rod 32 forms a pointer cooperable with a scale 34 which indicates the volumetric ratio of the two chamber volumes $V_1$ and $V_2$, which ratio is determined by the respective position of piston 31 in cylinder 30.

The pressure reducing relay or valve 23 corresponds, in its design, to the pressure reducing relay or valve 3, so that again two valves 35 and 36 are controlled by the common control diaphragm 37.. These valves regulate the issuance of gas from chambers 38 and 39, respectively, through respective discharge pipes 40 and 41 leading to the gas mixing tank 24.

The device operates in a manner which will now be described. Assuming that the two gases under pressure A and B enter the respective feed lines 1 and 2 with different pressures, the function of pressure reducing relay 3 is to assure that the two gases are expanded to the same pressure in chambers 13 and 14, this presure being adjusted to the value of the pressure of the gas having a lower initial pressure. The pressure reducing valve or relay thus serves, at the same time, to make certain that, if one pressure gas no longer issues from its feed pipe, the shut-off valve for the other gas remains closed.

In place of the gas reducing valve or relay, shown in the drawings, there can be used any other pressure reducing relay. The pressure reducing relay 3 also can be omitted if the supply of the two gases A and B at constant pressure through gas distributor 17 to ratio adjuster 20 is insured and the pressure is equalized.

In the position of the parts shown in FIG. 1, gases A and B flow through respective lines 18 and 19 into respective chambers $V_1$ and $V_2$ of ratio adjuster 20 until the pressure prevailing in the reducing relay 3 is attained. After chambers $V_1$ and $V_2$ have been completely filled, or even sooner, provided the pressure in the chambers $V_1$ and $V_2$ is equal, gas distributor 17, acting as a switching valve, is switched so that the two gases can flow from chambers $V_1$ and $V_2$ through the additional pressure reducing relay or valve to mixing tank 64, the gases expanding to the pressure of the additional reducing relay.

Switching of gas distributor 17 can be effected in time-dependence and be controlled, for example, in dependence on the timing device. However, the gas distributor also can be controlled in dependence on the pressure in gas mixing tank 24, and on the differential pressures, respectively, between the pressure in the gas mixing tank 24 and the pressures at other points of the device.

For exact operation, it is important that gas distributor 17 works properly, so that the two chambers $V_1$ and $V_2$ of ratio adjuster 20 are first shut off from feed pipes 15 and 16, during switching of gas distributor 17, after which the two chambers $V_1$ and $V_2$ are connected with the respective lines 21 and 22. Switching of gas distributor 17 in the opposite direction must also be effected in the same manner.

Pressure reducing valve or relay 23 serves to assure that the pressure drop, during outflow of gases from chambers $V_1$ and $V_2$, occurs uniformly. This has the effect that the gases flow off, through respective lines 40 and 41, to gas mixing tank 24, in correspondence with the desired mixing ratio.

With ratio adjuster 20, the volumetric ratio $V_1/V_2$ can be adjusted very accurately to any desired value, and the mixing ratio can be read directly on the scale 34.

Figure 3:
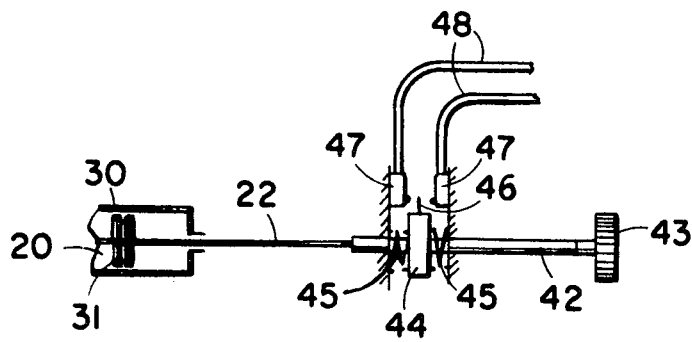
FIG. 3 illustrates a detail of the adjustment of the volumes of the two chambers.

Ratio adjuster 20 furthermore can be provided with a control device indicating whether the same pressure prevails in both chambers $V_1$ and $V_2$. Referring to FIG. 3, piston rod 32 is provided at its end with a spindle 42 carrying, at its end opposite pointer 33, a hand wheel 43. Spindle 42 is suported in a spindle bearing 44 which, in turn, is mounted by means of a guide (not shown) for minimum displacement in the axial direction of piston rod 32. Both sides of bearing 44 are under the bias of springs 45, which holds spindle bearing 44 in the position shown in FIG. 3. Bearing 44 is provided with a contactor 46 opposite to which are arranged, on both sides, switches 47 which are connected through conductors 48 into the circuit of an indicator.

If the pressures in the chambers $V_1$ and $V_2$ are not equal, piston 31, and thus spindle bearing 44, is displaced to one side or the other, so that the indicator is activated. The device shown in FIG. 3 thus permits a simple monitoring of the pressure in the ratio adjuster. If the ratio adjuster works properly, the pressure difference between chambers $V_1$ and $V_2$ is zero.

Figure 2:
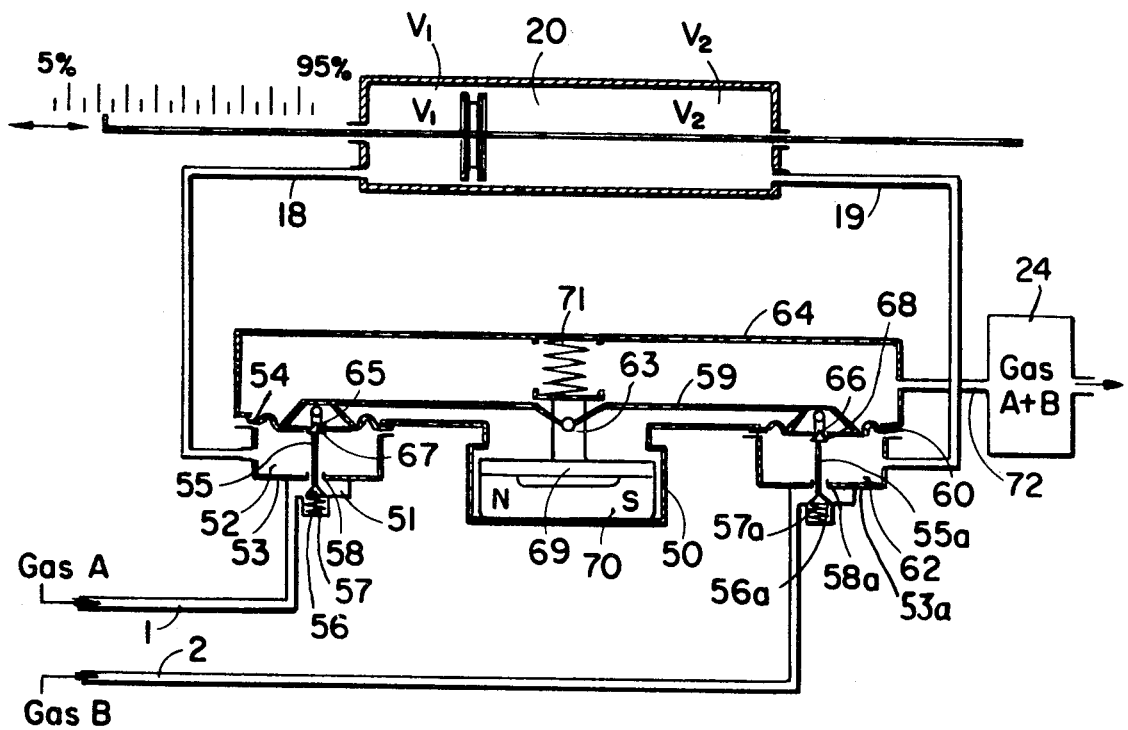

The embodiment of the invention shown in FIG. 2 differs from that shown in FIG. 1 in that pressure reducing relays or valves 4 and 23, as well as gas distributor 17, are combined to form a single device 50. The feed line 1 for pressurized gas A is connected to the antechamber 51 of a reducing valve 52 comprising a housing 53 and a diaphragm 54. Diaphragm 54 acts, in the manner described below, on a plunger 55 which controls a moving valve part 56 which is forced, under the bias of a closing spring 57, against a valve seat 58 arranged in the housing cover. Diaphragm 54 is further connected, through a rocker 59, with the control diaphragm 60 of a reducing valve 62 which is connected to the feed line 2 for the pressurized gas B. This latter reducing valve is designed in exactly the same manner as the reducing valve 52, and corresponding parts have been indicated by the suffix a. Rocker 59 is pivotally mounted in a bearing 63. The design of reducing valves 52 and 62, with their diaphragms 54 and 60 interconnected by a common rocker 59, has the same effect as the reducing relay or valve 3 shown in FIG. 1.

In FIG. 2, the pressure reducing relay or valve is also designed as a gas distributor. To this end, the outer surfaces of diaphragm 54 and 60 are enclosed in a housing 64. Valves 65 and 66 are arranged in the diaphragms and can be closed by moving valve parts 67 and 68 mounted on plungers 55.

Pivot bearing 63 of rocker 59 can be displaced toward and away from the plane of diaphragms 54 and 64, so that pivot bearing 63 assumes either the position shown in FIG. 2 or any other positions spaced from this position. For this purpose, pivot bearing 63 is secured on an armature 69 disposed above a magnet 70. In addition, a tension or compression spring 71 acts on bearing 63.

Lines 18 and 19 extend from housings 53 and 53a, respectively, of the associated reducing valves 52 and 62, to ratio adjuster 20. Gas mixing tank 24 is connected to housing cover 64 by line 72.

The arrangement shown in FIG. 2 operates in a manner which will now be described. With no pressurized gas flowing through feed lines 1 and 2, armature 69 is attracted by magnet 70 so that rocker 59 moves into the illustrated lower position and diaphragms 54 and 60 are deflected inwardly. Under the action of the two diaphragms, exerted through plungers 55 and 55a against biasing springs 57 and 57a, valves 56–58 and 56a–58a are moved to the open position while, on the other hand, valve 65–67 and 66–68 are closed. Pressurized gases A and B can thus flow through valves 56–58 and 56a–58a, respectively, and through lines 18 and 19, respectively, into the chambers $V_1$ and $V_2$, respectively, of ratio adjusted 20. The interconnection of diaphragms 54 and 60 by rocker 59 has the effect that the pressure in lines 18 and 19, and thus in the respective chambers $V_1$ and $V_2$, is the same, in the same manner as in the embodiment of the invention shown in FIG. 1, the pressure depending on the pressure of the gas having the lower pressure. If a higher pressure is effective, for example, in one diaphragm chamber, diaphragm 54 would deflect upwardly and close valve 56–58 while, on the other hand, diaphragm 60 would be moved, through rocker 59, in the opening direction for valve 56a–58a. The arrangement shown in FIG. 2 thus assures that the pressures in chambers $V_1$ and $V_2$ are equal during filling thereof and that the respective pressures increase to the same extent. When the gas feeding pressure in the two diaphragm chambers exceeds a certain value, the force exerted on diaphragms 54 and 60 is greater than the attraction of magnet 70, so that rocker 59 is then forced into its upper end position. Valves 56–58 and 56a–58a are closed by the action of compression springs 57 and 57a, respectively, while valves 65–67 and 66–68 are opened since the valve cones 67 and 69 disengage the valve seats 65 and 66 which are moved upwardly with the associated diaphragms. This has the result, on the one hand, that the supply of pressurized gases A and B through the respective feed lines 1 and 2 is interrupted while, on the other hand, these two gases, which are under equal pressures in chambers $V_1$ and $V_2$, can flow through valves 65–67 and 66–68, respectively, into the chamber under cover 64 and through discharge pipe 72 into the gas collecting tank 24.

Even during this outflow of gas, a uniform pressure drop in chambers $V_1$ and $V_2$ is assured by the connection of rocker 59 to the two diaphragms as, if the pressure in one diaphragm chamber under the diaphragm 54, for example, should decrease faster than that in the other diaphragm chamber under the diaphragm 60, valve 65–67 would move in a closing direction while valve 66–68 would move further in an opening direction. This has the effect that the outflow of pressurized gases A and B from chambers $V_1$ and $V_2$ occurs with equal pressure drops and thus in the desired mixing ratio, so that a gas mixture of the desired mixing ratio is always present in the chamber under housing cover 64.

If the pressure in the diaphragm chambers beneath diaphragms 54 and 60 drops below a certain value, the attraction of magnet 70 has a greater effect so that rocker 59 is pulled into its lowermost position and the above described filling operation is repeated. The mixing ratio of the gas discharged is independent of the back pressure and independent of the velocity of flow on the gas outlet side.

What is claimed is:

1. Apparatus for mixing gases in a predetermined ratio, to form a gas mixture, and for use with respiratory and medical equipment, said apparatus comprising, in combination, means forming respective chambers for the pressurized gases to be mixed, the ratio of the volumes of such chambers being equal to said predetermined ratio; respective feed lines for the pressurized gases; respective pressure regulators connected to said feed lines and operable to equalize the respective gas pressures; respective first shut-off valves each connecting a respective pressure regulator to a respective chamber; a common discharge line for the mixed gases; respective second shut-off valves each connecting a respective chamber to said discharge line; said shut-off valves switching said chambers alternately from the respective feed lines to said common discharge line, and vice versa.

2. Apparatus for mixing gases in a predetermined ratio, as claimed in claim 1, including respective second pressure regulators each connecting a respective second shut-off valve to said discharge line, said second pressure regulators being operable to equalize the respective pressures of the gases entering said discharge line.

3. Apparatus for mixing gases in a predetermined ratio, to form a gas mixture, and for use with respiratory and medical equipment, said apparatus comprising, in combination, means forming respective chambers for the pressurized gases to be mixed, the ratio of the volumes of such chambers being equal to said predetermined ratio; respective feed lines for the pressurized gases, respective pressure regulators connected to said feed lines and operable to equalize the respective gas pressures; respective first shut-off valves each connecting a respective pressure regulator to a respective chamber; a common discharge line for the mixed gases; and respective second shut-off valves each connecting a respective chamber to said discharge line; said first shut-off valves being conjointly operable in alternation with conjoint operation of said second shut-off valves; said first and second shut-off valves being combined to form a switching valve assembly.

4. Apparatus for mixing gases in a predetermined ratio, as claimed in claim 3, including timing means operating said switching valve assembly.

5. Apparatus for mixing gases in a predetermined ratio, as claimed in claim 3, including a pressure responsive control element operating said switching valve assembly.

6. Apparatus for mixing gases in a predetermined ratio, as claimed in claim 5, in which said control element is responsive to the pressure differential between said discharge line and said chambers.

7. Apparatus for mixing gases in a predetermined ratio, as claimed in claim 5, in which said control element is responsive to the pressure in said chambers.

8. Apparatus for mixing gases in a predetermined ratio, as claimed in claim 5, in which said control element is responsive to the pressure in said common discharge line.

9. Apparatus for mixing gases in a predetermined ratio, to form a gas mixture, and for use with respiratory and medical equipment, said apparatus comprising, in combinattion, means forming respective chambers for the pressurized gases to be mixed, the ratio of the volumes of such chambers being equal to said predetermined ratio; respective feed lines for the pressurized gases; respective pressure regulators connected to said feed lines and operable to equalize the respective gas pressures; respective first shut-off valves each connecting a respective pressure regulator to a respective chamber; a common discharge line for the mixed gases; respective second shut-off valves each connecting a respective chamber to said discharge line; said first pressure regulators being formed as a common unit having two pressure regulator chambers separated by a common control diaphragm and each connected to a respective feed line; means connecting said common diaphragm with two moving valve parts each forming part of a respective reducing valve of an associated pressure reducer chamber; and a respective outlet line connecting each pressure reducer chamber to a respective first shut-off valve.

10. Apparatus for mixing gases in a predetermined ratio, as claimed in claim 9, in which said moving valve part comprise valve closing parts, said reducing valves further comprising valve seats cooperable with said valve closing parts and arranged in housing covers of said unit, said housing covers extending parallel to said common control diaphragm.

11. Apparatus for mixing gases in a predetermined ratio, to form a gas mixture, and for use with respiratory and medical equipment, said apparatus comprising, in combination, means forming respective chambers for the pressurized gases to be mixed, the ratio of the volumes of such chambers being equal to said predetermined ratio; respective feed lines for the pressurized gases; respective pressure regulators connected to said feed lines and operable to equalize the respective gas pressures; respective first shut-off valves each connecting a respective pressure regulator to a respective chamber; a common discharge line for the mixed gases; respective second shut-off valves each connecting a respective chamber to said discharge line; said apparatus including two pressure regulators each connected to a respective one of two feed lines for the pressurized gases, each pressure regulator having a control diaphragm; and a pivotally mounted rocker connected at respective opposite ends to said control diaphragms.

12. Apparatus for mixing gases in a predetermined ratio, as claimed in claim 11, in which each pressure regulator includes a respective control chamber provided with a respective shut-off valve controlled by the associated control diaphragm and opened when the pressure in the associated control chamber attains a preselected value; the outlets of said last mentioned shut-off valve being connected to said discharge line.

13. Apparatus for mixing gases in a predetermined ratio, as claimed in claim 12, in which each of said last mentioned shut-off valves comprises a valve seat arranged in the associated control diaphragm and a respective valve closing member cooperable with each valve seat; means biasing said valve closing parts to the closed position; said valve closing parts having a limited stroke under the action of said biasing means.

14. Apparatus for mixing gases in a predetermined ratio, as claimed in claim 13, in which each reducing valve further includes a respective reducing valve assembly each including a valve seat and an associated second valve closing member; each second valve closing member being connected with a respective one of said first-mentioned valve closing members.

15. Apparatus for mixing gases in a predetermined ratio, as claimed in claim 11, including a pivot bearing for said rocker; means mounting said pivot bearing for displacement perpendicularly to the common plane above said control diaphragms; a magnet influencing the position of said pivot bearing in a manner such that, when the pressures effective on said control diaphragms decrease below a presettable value, said pivot bearing occupies one end position and, when the pressures effective on said control diaphragms exceed a presettable value, said pivot bearing is in the opposite end position.

16. Apparatus for mixing gases in a predetermined ratio, as claimed in claim 15, including a biasing spring acting on said pivot bearing in opposition to said pivot bearing.

17. Apparatus for mixing gases in a predetermined ratio, as claimed in claim 11, including a pivot bearing for said rocker; means mounting said pivot bearing for displacement in a direction perpendicular to the common plane of said control diaphragms; and a snap action device connected to said pivot bearing and operable, when the pressures effected on said control diaphragms decrease below a preselectable value, said pivot bearing is moved to one end position and, when the pressures effective on said control diaphragms exceed a preselectable value, said pivot bearing is moved to the other end position.

18. Apparatus for mixing gases in a predetermined ratio, to form a gas mixture, and for use with respiratory and medical equipment, said apparatus comprising, in combination, means forming respective chambers for the pressurized gases to be mixed, the ratio of the volumes of such chambers being equal to said predetermined ratio; respective feed lines for the pressurized gases; respective pressure regulators connected to said feed lines and operable to equalize the respective gas pressures; respective first shut-off valves each connecting a respective pressure regulator to a respective chamber; a common discharge line for the mixed gases; and respective second shut-off valves each connecting a respective chamber to said discharge line; the volumes of said chambers being adjustable.

19. Apparatus for mixing gases in a predetermined ratio, as claimed in claim 18, in which said chambers are formed in a cylinder having adjustable chamber-separating piston means therein.

20. Apparatus for mixing gases in a predetermined ratio, as claimed in claim 19, including an adjusting device operable to adjust said chamber-separating piston means; and mechanism on said adjusting device indicating the position of said chamber-separating piston means and the volumetric ratio of said chambers.

21. Apparatus for mixing gases in a predetermined ratio, as claimed in claim 20, including means operatively associated with said adjusting device and indicating the pressures in said chambers.

22. Apparatus for mixing gases in a predetermined ratio, as claimed in claim 21, in which said pressure indicating means comprises a spindle connected to said piston means and supported in a spindle bearing; biasing springs biasing said spindle bearing to a neutral position; respective contactors on opposite sides of said spindle bearing; respective switches each placed a small distance from a respective contactor for operation by the latter upon displacement of said spindle bearing in a respective direction; and conductors connected to said switches and consituting alarm lines for an indicator.

References Cited

UNITED STATES PATENTS

| 3,369,558 | 2/1968 | Hughey | 137—88 |
| 3,515,155 | 6/1970 | Haffner | 137—7 |

LAVERNE D. GEIGER, Primary Examiner

W. H. WRIGHT, Assistant Examiner

U.S. Cl. X.R.

137—98